United States Patent [19]

Nagamatsu

[11] Patent Number: 4,926,586
[45] Date of Patent: May 22, 1990

[54] BOX FOR CULTIVATING PLANT

[76] Inventor: Mutuo Nagamatsu, 33-4, Kasumigaoka 4-chome, Higashi-ku, Fukuoka-shi, Japan

[21] Appl. No.: 319,900

[22] Filed: Mar. 3, 1989

Related U.S. Application Data

[63] Continuation of Ser. No. 72,072, Jul. 10, 1987, abandoned.

[30] Foreign Application Priority Data

Oct. 23, 1986 [JP] Japan ................. 61-253152

[51] Int. Cl.$^5$ .................. A01G 9/02; E02D 29/00
[52] U.S. Cl. ........................ 47/66; 405/258; 52/408; 47/86
[58] Field of Search ................. 47/59–61, 47/14, 33, 40, 66, 68, 71, 73, 79, 82, 83, 85, 86, 87; 405/258; 52/408

[56] References Cited

U.S. PATENT DOCUMENTS

| | | | |
|---|---|---|---|
| 19,406 | 11/1889 | Whilldin | 47/66 |
| 1,251,826 | 1/1918 | Schroeder | 47/14 |
| 2,134,647 | 10/1938 | Savage | 47/66 |
| 2,169,701 | 8/1939 | Lund | 47/61 |
| 2,188,880 | 1/1940 | Lewis et al. | 47/61 |
| 2,897,631 | 8/1959 | Howsley et al. | 47/60 |
| 3,009,291 | 11/1961 | Blackmore | 47/87 |
| 3,315,410 | 4/1967 | French | 47/66 |
| 3,751,852 | 8/1973 | Schrepper | 47/87 |
| 4,023,308 | 5/1977 | Staby | 47/48.5 |
| 4,058,930 | 11/1977 | Miles | 47/73 |
| 4,118,892 | 10/1978 | Nakamura et al. | 47/33 |
| 4,120,119 | 10/1978 | Engel | 47/66 |
| 4,449,324 | 5/1984 | Ostarly | 47/66 |
| 4,715,144 | 12/1987 | Lee | 47/66 |

FOREIGN PATENT DOCUMENTS

| | | | |
|---|---|---|---|
| 2289110 | 7/1976 | France | 47/68 |
| 8105726 | 7/1983 | Netherlands | 47/59 |
| 2098044 | 11/1982 | United Kingdom | 47/66 |

Primary Examiner—Danton D. DeMille
Attorney, Agent, or Firm—Jordan and Hamburg

[57] ABSTRACT

A box for cultivating plant such as turfs which can be mounted on the roof of the building is disclosed. Such box comprises a box body made of a bottom plate and a circumferential wall integrally connected to the periphery of the bottom plate, hollow ridges formed by elevating a part of the bottom plate, the hollow ridges having the upper surfaces thereof disposed below the upper end of the circumferential wall of the box body and a soil for cultivating plant filled in the box body, wherein the hollow ridges having water drainage apertures on the upper surface thereof and such water drainage apertures communicate with water drainage grooves defined on the rear surface of the hollow ridges. Due to such construction, the box can make the roof of the building being greenery which can be used for various purposes while protecting the surface of the roof.

3 Claims, 2 Drawing Sheets

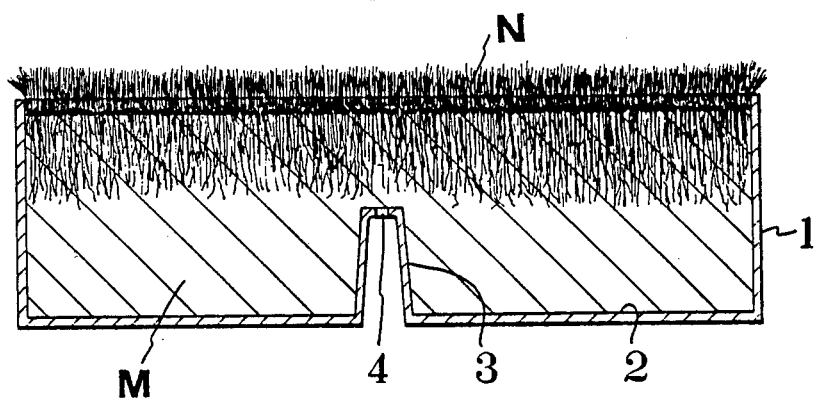
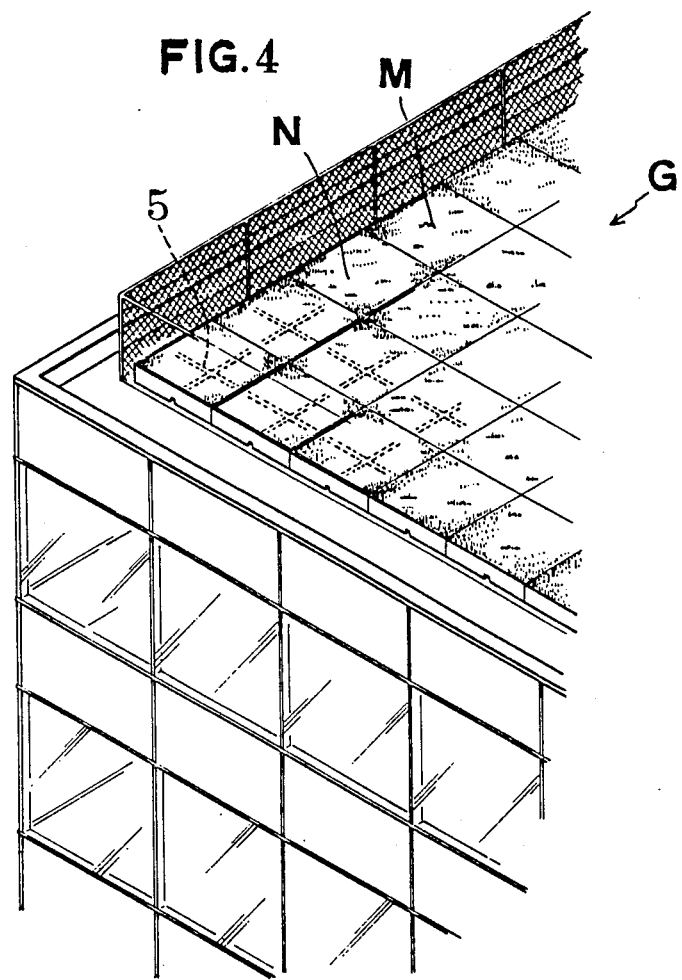

BOX FOR CULTIVATING PLANT

This application is a continuation, of application Ser. No. 072,072, filed July 10, 1987 now abandoned.

BACKGROUND OF THE INVENTION

The present invention relates to a box for cultivating plants which can readily make a natural garden on the roof of veranda of a building.

Owing to the remarkable progress of urbanization, most of the buildings in the cities and towns are made of concrete with flat concrete roofs.

The roofs of such buildings have grey rough surfaces thereof exposed so that a bird's-eye view of the city is almost uniformly grey. Furthermore, such roofs have not been used for any useful purposes.

Although some buildings utilize the roofs thereof for small play or leisure areas, such roofs still have the following problems.

Namely, in summer, the temperature of the surface of the roof rises up to 50° to 70° C. at noon due to the heat energy from the sun and the roof can hardly be used as a play or leisure area.

Furthermore, besides the roof of the building, the rooms located right below the roof become hot due to the radiation or conduction of the heat energy of the sun through the roof so that the air conditioning for cooling the rooms cannot cool the rooms sufficiently and the users of the rooms suffer a discomfort.

On the contrary, in winter, since such roof made exclusively of concrete has a poor insulation value, the heat energy of the rooms right below the roof escapes rapidly through the roof so that the heating system cannot warm the room sufficiently, resulting in an increase of cost for heating.

For resolving above defects of such roofs, people have tried to make the roof full of natural greenery. Such scheme has not been realized, however, since several problems such as the increase of the weight of the roof, water drainage, the weight of people standing on the roof or the possibility of plant cultivation on the concrete roof have not been resolved.

Accordingly, the installation of artificial turfs on the roof has been realized for providing greenery on the roof.

The artificial turfs, however, absorb and preserve the heat energy from the sun, the roof becomes extremely hot and gives discomfort to the people on the roof. Furthermore, the dust gradually accumulates in the turf and such dust cannot be removed easily so that the roof becomes unsanitary and the turf becomes faded.

Furthermore, the temperature of the surface of the concrete roof differs sharply between summer and winter at a level of about 70° C. so that the concrete roof expands and contracts sharply giving rise to cracks on the roof, and such cracks cause roof leakage which brings about damage of household goods such as wardrobes or the disturbing sound of feet of people walking on the roof penetrates the roof and echos in the room right below the roof of the building.

Accordingly, it is an object of the present invention to provide a box for cultivating plants which can overcome the above-mentioned defects of conventional roof structures and can provide natural greenery on the roof.

SUMMARY OF THE INVENTION

The present invention discloses a box for cultivating plant comprising a box body made of a bottom plate and a circumferential wall integrally connected to the periphery of the bottom plate, hollow ridges formed by elevating a part of the bottom plate, the hollow ridges having the upper surfaces thereof disposed below the upper end of the circumferential wall of the box body and a soil for cultivating plant filled in the box body, wherein the hollow ridges having water drainage apertures on the upper surface thereof and such water drainage apertures communicate with water drainage grooves defined on the rear surface of the hollow ridges.

BRIEF DESCRIPTION OF DRAWINGS

FIG. 3 is a cross sectional view of the box taken along the line I—I of FIG. 1, wherein the box is filled with the soil for cultivating plant.

FIG. 4 is a perspective view of a roof of a building where a plurality of boxes of cultivating plant are installed for making the roof greenery.

DETAILED DESCRIPTION OF A PREFERRED EMBODIMENT OF THE INVENTION

The present invention is hereinafter disclosed in detail in conjunction with the attached drawings.

Figure 1:
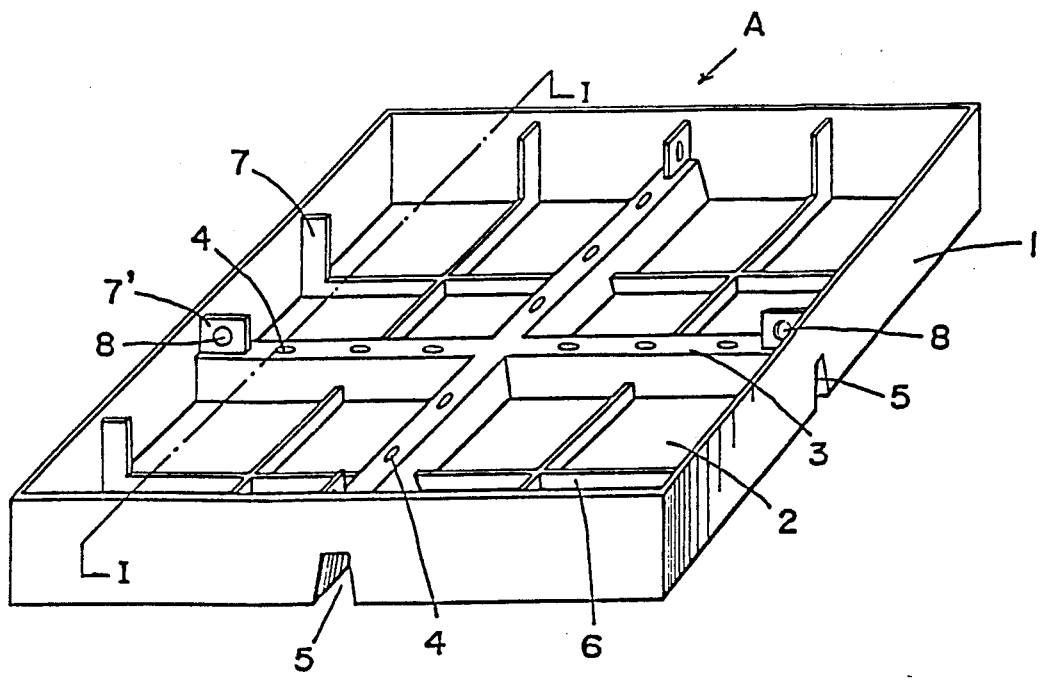
FIG. 1 is a perspective view of a box for cultivating plant of the present invention.

In FIG. 1, A indicates a box for cultivating plants and such box A is preferably made of a material which is resistant to corrosion such as plastic, light weight metal such as aluminum, ceramic, or fiber-reinforced porcelain.

Figure 2:
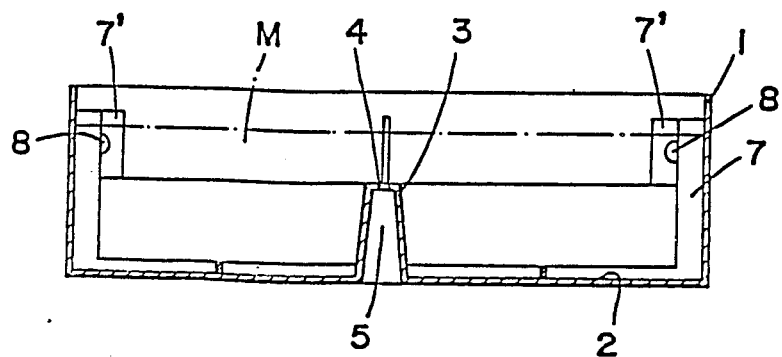
FIG. 2 is a cross sectional view of the box taken along the line I—I of FIG. 1.

As shown in FIG. 1 and FIG. 2, around the periphery of the rectangular bottom plate 2, a peripheral wall 1 is integrally connected and a plurality of hollow ridges 3 are provided on the upper surface of the bottom plate 2 in a cross form and such hollow ridges 3 have the upper surface thereof disposed below the upper end of the peripheral wall 1.

The hollow ridges 3 have a hollow trapezoidal cross section and a plurality of water drainage apertures 4 are formed in the upper surface of the hollow ridges 3. Furthermore, below or on the rear surface of the hollow ridges 3, water drainage grooves 5 which have the same cross section as that of the hollow ridges 3 are formed.

Due to such construction, as shown in FIG. 3, when the soil M for cultivating plants is filled in the box A, the water contained into the upper part of the soil M is discharged into the water drainage grooves 5 through water drainage apertures 4, while the water contained in the lower part of the soil M is prevented from draining through the apertures 4.

Accordingly, the hollow ridges 3 work as a reinforcing rib of the box A as well as a means for draining water from the box A.

Furthermore, in FIG. 1, numeral 6 indicates a plurality of reinforcing ribs formed in a cross shape in each space of the box defined by hollow ridges 3, while numeral 7 indicates a plurality of auxiliary reinforcing ribs reinforcing the connection between the hollow ridges 3 and reinforcing ribs 6.

An ear 7' is formed at the juncture of the upper surface of each ridge 3 with a respective side of the peripheral wall 1.

Numeral 8 indicates a respective hook opening formed in each ear 7' in which a hook for suspending and transporting the box A can be engaged.

In FIG. 4, is shown a roof garden created by using plant cultivating boxes A of this invention.

On the surface of the roof G of the concrete building, a multiplicity of boxes A for cultivating plants are mounted laterally and longitudinally to cover the surface of the roof G.

Into each box A soil M for cultivating plants is filled and natural turf segments N are planted on the soil M.

Such natural turf segments N can decompose dust by means of bacteria and use the decomposed material as a source of nutrition to stay fresh.

The boxes into which the soil M for cultivating the plants are filled can be mounted on a veranda or asphalt roof and are also utilized for horticulture.

The manner in which plants such as turf segments N are cultivated by using the above mentioned boxes A is hereinafter explained.

For cultivating turf segments N on the roof G of the building, the boxes A in which turf segments N are planted are mounted on the roof G.

Since the soil M for cultivating plants is filled into the boxes A in such a manner that the upper surface of the soil M is above the upper surface of the hollow ridges 3, the hollow ridges 3 are embedded in the soil M. Accordingly, the part of the water contained in the soil M above the water discharge apertures 4 formed in the hollow ridges 3 is discharged into the water discharge groove 5, while the part of the water contained in the soil M below the water discharge apertures 4 is held or reserved in the boxes A. Since the water discharge apertures 4 have a small diameter, the discharge of soil M through the apertures 4 can be effectively prevented.

Accordingly, the boxes A can promote the water reserving function as well as water discharge function which are both required for cultivating plants.

Therefore, sufficient water can be reserved in the boxes A to compensate for water evaporation from the boxes A by direct sunbeams Even at noon in summer, it becomes unnecessary to supply water to the boxes A for a week and also it becomes unnecessary to supply water at all from the midst of September to the beginning of the rainy season in Japan.

Furthermore, when the boxes A are mounted on the roof such that the boxes A abut each other laterally and longitudinally, the water discharge grooves 5 of respective boxes A are aligned with each other, forming elongated water discharge channels which lead to a water drainage pipe provided on the periphery of the roof G so that the drainage of water is rapidly and smoothly effected.

To recapitulate the features of the present invention, soil M for cultivating plants is filled into the boxes A for cultivating plants to a predetermined depth (for example, 10 cm) and the turf segments N are cultivated on the surface of the soil M. Since the hollow ridges 3 are disposed below the peripheral wall 1 and the water discharge apertures 4 and water discharge grooves 5 are formed in the upper and lower side of the hollow ridges 3, the water discharge and water reserve are both promoted bringing about the following effects. Namely, since the turf segments N are free from an excessive amount of water and receive an appropriate amount of water, rotting of the roots in the turf segments N as well as the corrosion of the concrete can be prevented. Simultaneously, since the appropriate amount of water is reserved in the boxes A by the water reserve function, the withering of the turf segments N can be also prevented.

Accordingly, cultivation of the turf segments N can be promoted with the boxes A of the present invention. Furthermore, by the installation or mounting of such boxes A on the roof G of the building, the soil M for cultivating plants and the turf segments N provide a heat insulating function, a sound insulating function and a vibration preventing function.

Furthermore, the maintenance of the turf segments N can be conducted in a manner conventional for ordinary turf.

Still furthermore, the turf segments N are effective, from an architectural viewpoint, for energy saving by the heat insulation, from the viewpoint of urbanization, for providing an environment of greenery, for the utilization of a roof for the promotion of physical and mental health, for the efficient utilization of land, and for the easing of pressure on the feet while walking on the roof.

A conventional roof is provided with a waterproof layer on a concrete substrate and a protective concrete layer (thickness 6 to 12 cm) on the water proof layer. In this invention, since the boxes A for cultivating plants also perform the function of the protective concrete layer, such protective concrete layer can be eliminated, thus decreasing the thickness of the roof. Accordingly, the weight of the roof can be decreased at a level of 120 to 200 kg/m$^2$. Furthermore, the boxes A act as a protective layer for preventing the deterioration of the roof by the heat energy of sunbeams.

The present invention is also characterized by the soil M for cultivating plants which is filled into the boxes A for cultivating plants.

Namely, in this embodiment, the soil M for cultivating plants is preferably made of a mixture comprising clinker ash, pearlite or equivalent material, organic fertilizer and water retaining agent.

Clinker ash is an industrial waste produced at the blast furnace or steam power generating station using coal as fuel and such ash has a specific weight of about 0.95 t/m$^3$ and therefore is light-weight and can be obtained in an inexpensive manner. Furthermore, similarly to sand, it has excellent water permeability compared to ordinary soils and can be used as an alternative for conventional soils for cultivating plant.

Pearlite is a material produced by crushing quartzite and burning such crushed quartzite and such pearlite is light-weight and has an excellent water retaining ability.

Organic fertilizer includes leaf mold or peat moss, organic material produced from rice straws or chaffs and manure heap produced from bark-oriented organic material.

Such organic fertilizer is used not only for supplying nutrition to the plants such as turf but also for lowering the hydrogen coefficient of the strongly alkaline clinker ash from pH 8.5 to pH 10.

Peat moss is most suitable as the organic fertilizer.

Although the desirable hydrogen coefficient for cultivating plants is pH 3.5 to 8.5, since a decrease in the hydrogen coefficient of clinker from pH 8.5 to pH 4 to 5 takes 7 to 10 years, clinker ash can be effectively used for more than 10 years continuously.

The water retaining agent preferably is one which has an excellent water retaining ability. As such agent, IGEDAGEL GREEN (a registered Japanese trade mark), which is produced by SUMITOMO CHEMICAL CO., LTD of JAPAN and is a high-molecular compound comprising carboxyl ($COO^-$) and hydrooxide, is suitable.

The soil M for cultivating plants is preferably produced by mixing above-mentioned materials in the following mixing ratio.

Namely, about 80% of clinker ash, about 10% of pearlite or equivalent material from about 10% of organic fertilizer and, if desired, a small amount of the water retaining agent are mixed together to produce the soil M having a specific weight of about 0.8 $t/m^3$.

The specific weight of the soil M is adjusted by varying the proportion of the clinker ash so that the weight of the boxes A which are mounted on the roof can be restricted sufficiently below the allowable weight limit that the roof can withstand.

It is also possible to adjust the mixing ratio of other materials such as pearlite or equivalent material or the organic fertilizer, depending on the kind of the plant to be cultivated.

The following chart shows the comparison of specific weights of the conventional soil for cultivating plants, the clinker ash and the soil M of the present invention.

| kind | specific weight ($t/m^3$) |
| --- | --- |
| conventional soil (sandy soil) for cultivating plants | 1.80 |
| sand | 2.30 |
| gravel | 2.40 |
| clinker ash | 0.95 |
| soil M for cultivating plant | 0.80 |

The soil M for cultivating plants is filled into the box A as shown in FIG. 3 until the depth of the soil M is about 10 cm, and the turf segments N are planted on the surface of the soil M.

In general, the cultivating of the plants on the roof of the building must meet following conditions.

1 the soil must be light-weight (the specific weight of the watered soil being primarily the specific weight of water).

2 the soil must have a sufficient water retaining ability.

3 the soil must have a reasonable water draining ability.

4 the soil must withstand the pressure of the feet even in rain.

5 the soil must cultivate the plants for a long period.

The soil M for cultivating plants can meet all of the above conditions.

Namely, the soil M for cultivating plants is substantially comprised of clinker ash which has a specific weight (0.95 $kg/m^3$) far smaller than the specific weight (1.6 $kg/m^3$ to 1.9 $kg/m^3$) of the conventional soil for cultivating plants. Furthermore, the clinker ash has a better water permeability than the conventional soil for cultivating plants.

Accordingly, the specific weight of the soil M can be lowered to about 0.8 $t/m^3$, while the water drainage ability of the soil M can be maintained at a suitable level.

Furthermore, by the inclusion of the light-weight organic fertilizer, the nature of the clinker ash is changed from strongly alkaline to weakly alkaline, which is suitable for cultivating plants.

Still furthermore, pearlite or equivalent material which is light-weight and has an excellent water retaining ability, can impart a favorable water retaining function to the soil M coupled with the effect of the water retaining agent so that it becomes unnecessary to supply water to the soil M frequently as in the case of the conventional soil.

In this manner, since the specific weight of the soil M can be reduced to about 0.8 $t/m^3$, the plant cultivating box A filled with the soil M can be restricted to less than 120 $kg/m^2$.

Furthermore, since the soil for cultivating turf segments N is the aforementioned soil M, which is light-weight and has a favorable water drainage ability and provides suitable nutrition and has water retaining ability and can withstand the foot pressure of people walking on the turf segments N, the boxes A can be mounted on the roof G without violating any laws restricting the weight of objects to be mounted on the roof G. The soil M can also provide a cushion function to the man walking on the roof, and protect the waterproof layer of the roof from the sunbeams.

Furthermore, since the boxes A or the soil M can retain the water on a rainy day, it becomes unnecessary to supply water to the turf frequently, facilitating the maintenance of the turf segments N as well as the saving of water.

Furthermore, since the main material of the soil M is the clinker ash, the soil M can be produced cheaply making use of the clinker ash, which is the industrial waste.

Still furthermore, since roofs, verandas and terraces can be covered with greenery, the following advantages are achieved, namely, the considerable energy saving from the architectural viewpoint by the effective heat insulation, the maximum utilization of land by making the roof being 100% greenery, the providing of an environment of greenery from the viewpoint of urbanization, the alleviation of the deserting of the cities, the promotion of physical and mental health, and the easing of pressure on the feet while walking on the roof, all of which assure a more humane life in cities.

I claim:

1. The combination of a building having a roof, a drainage pipe at the periphery of the roof and a roof-protective covering substantially entirely covering the roof and comprising a plurality of rectangular-shaped turf cultivating plant boxes which are installed on the roof contiguously laterally and longitudinally to form a grid, each said turf cultivating plant box comprising:
(a) a rectangular bottom plate bounded by four side walls,
(b) a first hollow ridge extending longitudinally entirely across the box between a first opposed pair of said side walls and having a central portion substantially equidistantly spaced from the side walls of said first opposed pair of side walls,
(c) a second hollow ridge extending laterally entirely across the box between a second opposed pair of said side walls and having a central portion substantially equidistantly spaced from the side walls of said second opposed pair of side walls,
(d) the first and second hollow ridges being constituted of elevated portions of said bottom plate, the ridges each having an upper extremity which is of lesser elevation than the side walls, (e) the central portion of the first hollow ridge and the central portion of the second hollow ridge integrally merging at right angles, (f) a multiplicity of water drainage perforations formed through each of the first and second ridges at regular intervals at the upper extremity thereof, (g) the underside of each of the first and second ridges defining water drainage grooves communicating with said multiplicity of perforations and opening at each end through a respective wall of said respective opposed pair of walls between which said respective ridge extends, the groove defined by the first ridge and the groove defined by the second ridge communicating with each other at said integrally merged central portions, said openings of said water drainage grooves being aligned and in communication with the openings of the water drainage grooves formed in a plurality of turf cultivating plant boxes which are laterally and longitudinally contiguous with said cultivating plant box to form continuous lateral and longitudinal water drainage channels, (h) each of said boxes being filled to a level above said ridges with soil for cultivating turf, and (i) natural turf planted on said soil.

2. The combination according to claim 1, wherein said soil for cultivating turf is a mixture consisting essentially of clinker ash and organic fertilizer.

3. The combination according to claim 1, in which each of said turf-cultivating plant boxes further comprises reinforcing ribs extending longitudinally and laterally across the bottom plate between the ridges and the side walls.

* * * * *